United States Patent
Sawai

(10) Patent No.: US 9,730,084 B2
(45) Date of Patent: Aug. 8, 2017

(54) COMMUNICATION CONTROL METHOD AND SMALL-OR-MEDIUM-SCALE BASE STATION

(75) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 578 days.

(21) Appl. No.: 13/579,059

(22) PCT Filed: Jan. 25, 2011

(86) PCT No.: PCT/JP2011/051305
§ 371 (c)(1),
(2), (4) Date: Aug. 15, 2012

(87) PCT Pub. No.: WO2011/118248
PCT Pub. Date: Sep. 29, 2011

(65) Prior Publication Data
US 2012/0309292 A1 Dec. 6, 2012

(30) Foreign Application Priority Data

Mar. 25, 2010 (JP) ................. 2010-070262

(51) Int. Cl.
*H04B 5/00* (2006.01)
*H04W 24/02* (2009.01)
(Continued)

(52) U.S. Cl.
CPC ............ *H04W 24/02* (2013.01); *H04W 16/32* (2013.01); *H04W 84/045* (2013.01);
(Continued)

(58) Field of Classification Search
CPC .................................................. H04W 84/045
See application file for complete search history.

(56) References Cited

U.S. PATENT DOCUMENTS

2007/0019573 A1  1/2007 Nishimura
2007/0291663 A1* 12/2007 Dixit ....................... H04L 12/66
                                                              370/254
(Continued)

FOREIGN PATENT DOCUMENTS

CN    1905401 A    1/2007
JP    2007-36423   2/2007
(Continued)

OTHER PUBLICATIONS

Japanese Office Action issued Jul. 30, 2013 in Patent Application No. 2010-070262.
Japanese Office Action issued Jul. 29, 2014 in Japanese Patent Application No. 2013-237901.
Singaporean Examination Report issued Sep. 5, 2014, in Singaporean Patent Application No. 2012070215.
(Continued)

*Primary Examiner* — Hsin-Chun Liao
(74) *Attorney, Agent, or Firm* — Oblon, McClelland, Maier & Neustadt, L.L.P.

(57) ABSTRACT

Provided is a communication control method for use in a small-or-medium-scale base station including the steps of: receiving a radio signal transmitted from a communication terminal or a large-scale base station; acquiring information of the communication terminal or the large-scale base station by analyzing the radio signal; selecting one operation range among a plurality of types of operation ranges based on the information of the communication terminal or the large-scale base station; and communicating with the communication terminal in accordance with the operation range selected from among the plurality of types of operation ranges.

16 Claims, 10 Drawing Sheets

(51) Int. Cl.
| | |
|---|---|
| *H04W 84/10* | (2009.01) |
| *H04W 88/08* | (2009.01) |
| *H04W 16/32* | (2009.01) |
| *H04W 84/04* | (2009.01) |

(52) U.S. Cl.
CPC ........ *H04W 84/047* (2013.01); *H04W 84/105* (2013.01); *H04W 88/08* (2013.01)

(56) References Cited

U.S. PATENT DOCUMENTS

| | | |
|---|---|---|
| 2009/0092096 A1 | 4/2009 | Czaja et al. |
| 2009/0245162 A1 | 10/2009 | Beems Hart et al. |
| 2010/0035541 A1 | 2/2010 | Kim et al. |

FOREIGN PATENT DOCUMENTS

| | | |
|---|---|---|
| JP | 2007-36423 A | 2/2007 |
| JP | 2010-502042 A | 1/2010 |
| JP | 2010-521927 A | 6/2010 |
| KR | 10-2009-0114098 | 11/2009 |
| WO | WO 03/013168 A1 | 2/2003 |
| WO | WO 2005/120101 A1 | 12/2005 |

OTHER PUBLICATIONS

International Search Report issued Feb. 22, 2011 in PCT/JP2011/051305.
Reasearch in Motion UK Limited, "Intra-Donor Cell eNB-Relay CoMP and its Performance Analysis", 3GPP TSG RAN WG1 Meeting #59 R1-094465, Nov. 9-Nov. 13, 2009, pp. 1-4.
Qualcomm Europe, "Heterogeneous Networks: General Views", 3GPP TSG-RAN WG1 #8bis R1-094224, Oct. 12-16, 2009, pp. 1-4.
China Potevio, Catt, "Considerations on LTE Relay", 3GPP TSG RAN WG1 meeting #55b, Jan. 11-16, 2009, 12 pages.
Chinese Office Action issued Oct. 21, 2014, in China Patent Application No. 201180014596.5 (with English translation).
"Relaying for LTE-Advanced", Alcatel Shanghai Bell, Alcatel-Lucent, 3GPP TSG RAN WG1 Meeting #55, R1-084136, Nov. 10-14, 2008, 6 pages.
European Supplementary Search Report issued Apr. 18, 2016, in Europe Patent Application No. 11759057.0-1505/2552146. (7 pgs.).
Sam Yeoul Choi et al.; "Adaptive Coverage Adjustment for Femtocell Management in a Residential Scenario"; APNOMS 2009, LNCS 5787, pp. 221-230, 2009.
Combined Chinese Office Action and Search Report issued May 10, 2016 in Patent Application No. 201180014596.5 (with English Translation).

* cited by examiner

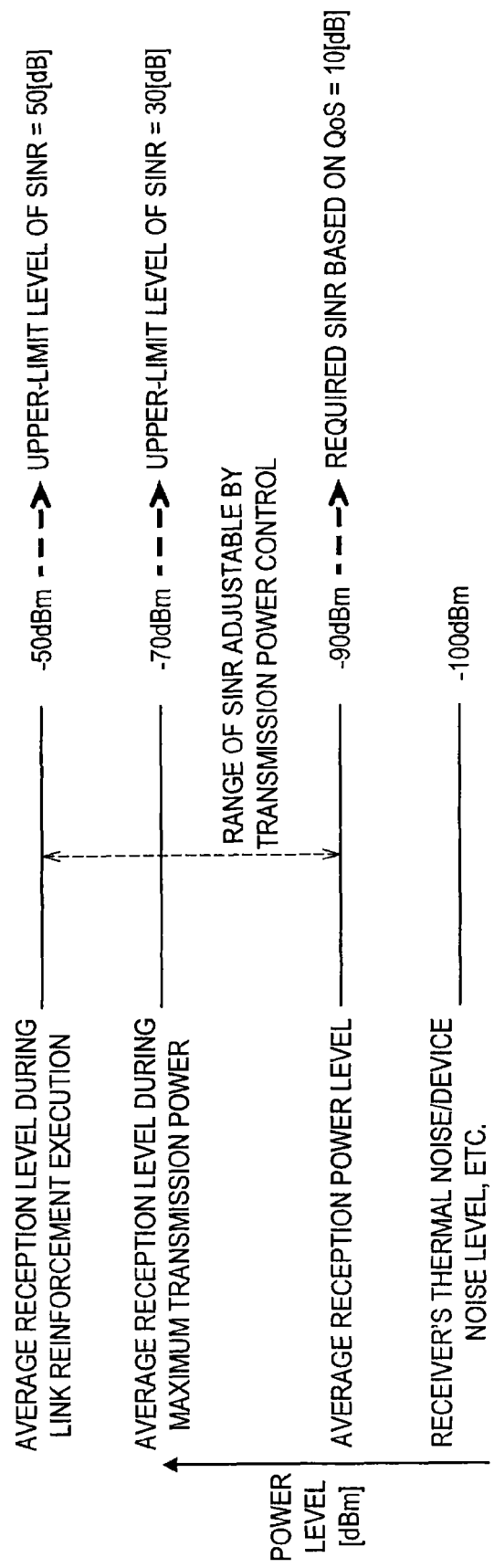

COMMUNICATION CONTROL METHOD AND SMALL-OR-MEDIUM-SCALE BASE STATION

TECHNICAL FIELD

The present invention relates to a communication control method and a small-or-medium-scale base station.

BACKGROUND ART

Recently, a heterogeneous network has been suggested as the next-generation communication network. This heterogeneous network is a network in which a plurality of kinds of small-or-medium-scale base stations coexist in a macro-cell by performing overlay transmission or spectrum sharing. A Remote RadioHead (RRH) cell base station, a hot zone base station (Pico/micro-cell eNB), a femto-cell base station (Home eNB), a relay device (relay base station), and the like are referred to as small-or-medium-scale base stations.

Each small-or-medium-scale base station described above, for example, can perform an operation for reinforcing link quality between a communication terminal and a macro-cell base station, an operation for increasing an area capacity, an operation for extending communication coverage, or an operation for operating an independent cell.

There are many technologies for controlling an operation of the above-described small-or-medium-scale base station from a fixed network side. For example, the fixed network side can reduce power consumption of the small-or-medium-scale base station by managing a sleep mode of the small-or-medium-scale base station. As an example of the small-or-medium-scale base station, a relay apparatus is disclosed, for example, in Non-Patent Literature 1.

CITATION LIST

Non-Patent Literature

Non-Patent Literature 1: R1-090015, "Consideration on Relay.ppt", China Potevio, CATT, January 2009

SUMMARY OF INVENTION

Technical Problem

Here, the case in which a function for executing a plurality of types of operations is implemented in one small-or-medium-scale base station is assumed. For example, a small-or-medium-scale base station corresponding to both an operation for reinforcing link quality between a communication terminal and a macro-cell base station and an operation for increasing an area capacity is assumed to be developed. However, when the operation of the small-or-medium-scale base station is controlled from the fixed network side as described above, it is difficult for the small-or-medium-scale base station corresponding to a plurality of types of operations to immediately execute an appropriate operation corresponding to a situation.

The present invention has been made in view of the above-described problems, and an object of the present invention is to provide a novel and improved communication control method and small-or-medium-scale base station, which can autonomously select an operation range in the small-or-medium-scale base station and perform communication in accordance with the selected operation range.

Solution to Problem

According to the first aspect of the present invention in order to achieve the above-mentioned object, there is provided a communication control method for use in a small-or-medium-scale base station including the steps of: receiving a radio signal transmitted from a communication terminal or a large-scale base station; acquiring information of the communication terminal or the large-scale base station by analyzing the radio signal; selecting one operation range among a plurality of types of operation ranges based on the information of the communication terminal or the large-scale base station; and communicating with the communication terminal in accordance with the operation range selected from among the plurality of types of operation ranges.

The plurality of types of operation ranges may include: a first operation range for link reinforcement between the communication terminal and the large-scale base station; a second operation range for improving a capacity; a third operation range for extending communication coverage; and a fourth operation range in which the small-or-medium-scale base station operates a cell.

The step of selecting the operation range may be a step of selecting the first operation range when link quality between the communication terminal and the large-scale base station is less than a predetermined standard.

The step of selecting the operation range may be a step of selecting the second operation range when a degree of congestion of traffic in the large-scale base station is greater than an upper limit.

The step of selecting the operation range may be a step of selecting the third operation range when a distribution of the communication terminals is biased toward a cell edge of the large-scale base station.

The step of selecting the operation range may be a step of selecting the fourth operation range when the small-or-medium-scale base station and the communication terminal are out of a cell area of the large-scale base station.

The first operation range may include a relay operation of communication between the large-scale base station and the communication terminal or a CoMP operation. The second operation range may include an overlay transmission operation. The third operation range may include the relay operation or an operation of operating a cell.

The step of selecting the operation range may be a step of selecting the operation range from the first operation range and the fourth operation range when a connection between the large-scale base station or a network, which manages the large-scale base station, and the small-or-medium-scale base station is only a wired connection.

The step of selecting the operation range may be a step of selecting the operation range from the first operation range, the second operation range, and the third operation range when the connection between the large-scale base station or the network, which manages the large-scale base station, and the small-or-medium-scale base station is only a wireless connection.

The step of selecting the operation range may be a step of selecting the operation range from the first operation range, the second operation range, the third operation range, and the fourth operation range when the connection between the large-scale base station or the network, which manages the large-scale base station, and the small-or-medium-scale base station is the wireless connection and the wired connection.

The large-scale base station or the network, which manages the large-scale base station, may perform interference avoidance control for avoiding interference caused due to communication by the small-or-medium-scale base station.

According to the second aspect of the present invention in order to achieve the above-mentioned object, there is provided a small-or-medium-scale base station including: a reception unit for receiving a radio signal transmitted from a communication terminal or a large-scale base station; an information acquisition unit for acquiring information of the communication terminal or the large-scale base station by analyzing the radio signal; a selection unit for selecting one operation range among a plurality of types of operation ranges based on the information of the communication terminal or the large-scale base station; and a communication control unit for controlling communication with the communication terminal in accordance with the operation range selected from among the plurality of types of operation ranges.

Advantageous Effects of Invention

According to the present invention as described above, a small-or-medium-scale base station can autonomously select an operation range and perform communication in accordance with the selected operation range.

BRIEF DESCRIPTION OF DRAWINGS

FIG. 10 is an explanatory diagram illustrating an adjustable SINR range.

DESCRIPTION OF EMBODIMENTS

Figure 1:
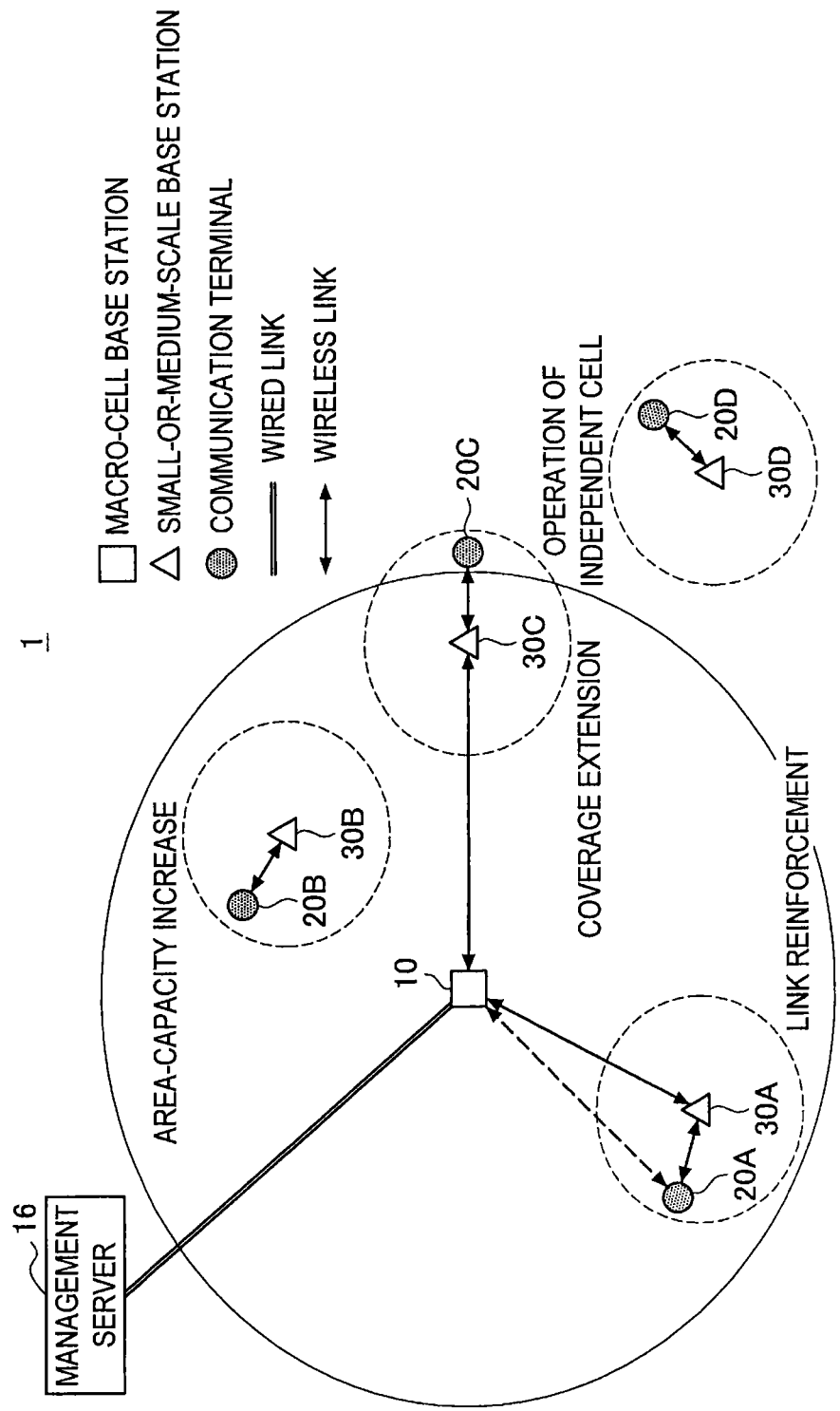
FIG. 1 is an explanatory diagram illustrating a configuration of a communication system according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In addition, in this specification and the drawings, a plurality of elements having substantially the same functional configuration may be distinguished from each other by each having a different letter added to the same reference numeral. For example, a plurality of elements having substantially the same functional configuration are distinguished from each other as communication terminals 20A, 20B, and 20C, if necessary. However, if it is not particularly necessary to distinguish each of a plurality of elements having substantially the same functional configuration, only the same reference numeral is assigned. For example, if it is not particularly necessary to distinguish the communication terminals 20A, 20B, and 20C, they are simply referred to as the communication terminal 20.

In addition, "Description of Embodiments" will be given in the following item order.
1. Overview of Embodiments of Present Invention
2. Information to Be Used for Selection of Operation Range
3. Content of Operation Ranges
4. Method of Selecting Operation Range
5. Monitoring by Management Server
6. Summary 1. Overview of Embodiments of Present Invention First, a configuration of a communication system 1 according to an embodiment of the present invention will be described with reference to FIG. 1. FIG. 1 is an explanatory diagram illustrating the configuration of the communication system 1 according to the embodiment of the present invention. As illustrated in FIG. 1, the communication system 1 according to the embodiment of the present invention includes a macro-cell base station 10, a management server 16, communication terminals 20A to 20D, and small-or-medium-scale base stations 30A to 30D.

The macro-cell base station 10 is a large-scale base station that manages scheduling information of a small-or-medium-scale base station 30 and a communication terminal 20, which are present within a macro cell, and communicates with the small-or-medium-scale base station 30 and the communication terminal 20 according to the scheduling information.

The management server 16 receives management information indicating a state of a cell formed by the macro-cell base station 10 from each base station 10, and controls communication in the cell formed by the macro-cell base station 10 based on the management information. A function of the management server 16 may be implemented in the macro-cell base station 10 or either small-or-medium-scale base station. In addition, the management server 16 may have a function as a mobile management entity (MME) or gateway apparatus.

The communication terminal 20 is a user terminal that communicates with the small-or-medium-scale base station 30 or the macro-cell base station 10. This communication terminal 20, for example, may be a portable phone or a personal computer (PC).

The small-or-medium-scale base station 30 autonomously selects an operation range suitable for a current situation from a plurality of operation ranges, and communicates with the communication terminal 20 in accordance with the selected operation range.

For example, when a communication link between the macro-cell base station 10 and the communication terminal 20A is less than a predetermined quality, the small-or-medium-scale base station 30A performs communication in accordance with an operation range (operation range A) for reinforcing the communication link between the macro-cell base station 10 and the communication terminal 20A as illustrated in FIG. 1.

In addition, when a degree of congestion of a macro cell is greater than a predetermined standard, the small-or-medium-scale base station 30B communicates with the communication terminal 20B in accordance with an operation range (operation range B) for increasing an area capacity as illustrated in FIG. 1.

In addition, when a distribution of communication terminals is biased toward a cell edge of the macro cell, the small-or-medium-scale base station 30C communicates with the communication terminal 20C in accordance with an operation range (operation range C) for extending coverage as illustrated in FIG. 1.

In addition, when the small-or-medium-scale base station 30D and the communication terminal 20D are out of a range of the macro cell, the small-or-medium-scale base station 30D provides a communication opportunity to the communication terminal 20D by operating an independent cell (operation range D) as illustrated in FIG. 1.

Hereinafter, the entire operation in the above-described communication system 1 will be described along with a configuration of the small-or-medium-scale base station 30.

Figure 2:
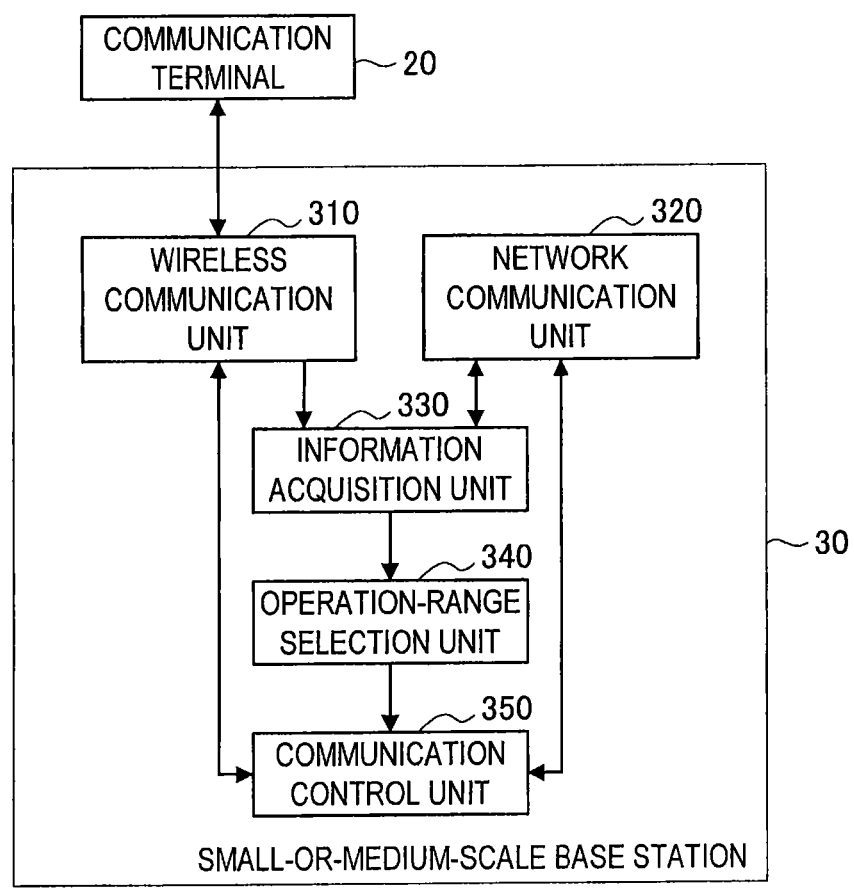
FIG. 2 is an explanatory diagram illustrating a configuration example of a small-or-medium-scale base station according to the embodiment of the present invention.

FIG. 2 is an explanatory diagram illustrating an example of the configuration of the small-or-medium-scale base station 30 according to the embodiment of the present invention. As illustrated in FIG. 2, the small-or-medium-scale base station 30 includes a wireless communication unit 310, a network communication unit 320, an information acquisition unit 330, an operation-range selection unit 340, and a communication control unit 350. The wireless communication unit 310 is configured for wirelessly communicating with the communication terminal 20, and the network communication unit 320 is configured for performing wired communication and/or wireless communication with a network side such as the macro-cell base station 10 or the management server 16.

Figure 3:
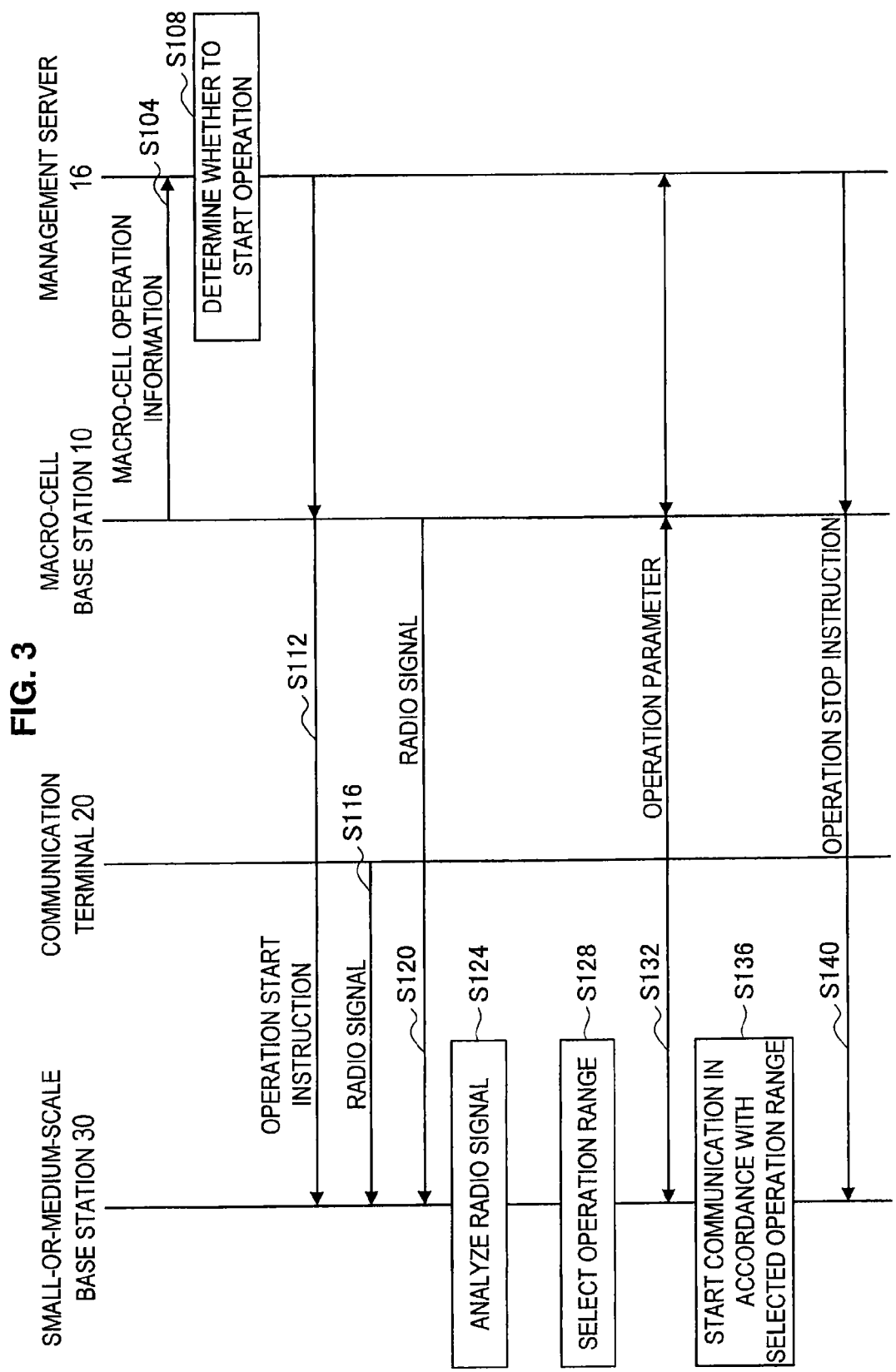
FIG. 3 is a sequence diagram illustrating the entire operation in the communication system according to the embodiment of the present invention.

FIG. 3 is a sequence diagram illustrating the entire operation in the communication system 1 according to the embodiment of the present invention. As illustrated in FIG. 3, the macro-cell base station 10 acquires macro-cell operation information, and reports the macro-cell operation information to the management server 16 (S104). For example, a BER/PER, the number of retransmissions, a statistical value such as an average value of throughput, traffic information, or the like corresponds to the macro-cell operation information.

Subsequently, the management server 16 determines whether or not to start an operation of the small-or-medium-scale base station 30 (S108). Specifically, position information of each small-or-medium-scale base station 30 is registered in the management server 16, and the management server 16 determines to start the operation of the small-or-medium-scale base station 30 when the communication terminal 20 has moved to a communication area of a certain small-or-medium-scale base station 30. The management server 16 instructs the small-or-medium-scale base station 30 to start the operation (S112).

Thereafter, the wireless communication unit 310 of the small-or-medium-scale base station 30 receives radio signals (for example, a preamble, a pilot signal, and a reference signal) transmitted from the communication terminal 20 or the macro-cell base station 10 (S116 and S120). The information acquisition unit 330 acquires information to be used to select an operation range by analyzing the radio signals received by the wireless communication unit 310 (S124). In addition, the information acquisition unit 330 may acquire information from the management server 16 via the network communication unit 320.

Subsequently, the operation-range selection unit 340 of the small-or-medium-scale base station 30 selects one operation range of operation ranges A to D based on the information acquired by the information acquisition unit 330 (S128). Thereafter, the small-or-medium-scale base station 30 notifies the management server 16 of the selected operation range, and acquires operation parameters (for example, transmission power, a slot, and a transmission rate) from the management server 16 (S132).

The communication control unit 350 of the small-or-medium-scale base station 30 starts control of the wireless communication unit 310 using the operation parameters acquired from the management server 16 in accordance with the operation range selected by the operation-range selection unit 340 (S136). Thereafter, the management server 16 monitors communication by the small-or-medium-scale base station 30, issues an instruction for a change in an operation parameter, for example, when communication by the small-or-medium-scale base station 30 leads to interference, and instructs the small-or-medium-scale base station 30 to stop an operation when interference is not removed (S140).

As described above, the small-or-medium-scale base station 30 according to the embodiment of the present invention autonomously selects an operation range suitable for a current situation. Therefore, the small-or-medium-scale base station 30 can immediately reflect the fluctuation in a communication environment in the operation range. Hereinafter, particulars related to the above-described embodiment of the present invention will be described in detail.

2. Information to be Used for Selection of Operation Range

In the embodiment of the present invention, the small-or-medium-scale base station 30 uses the following information (1) to (6) for selection of the operation range.

Information (1): Operation Information of Macro Cell

Information (2): Position Information of Macro-Cell Base Station 10

Information (3): Communication-Path Environment between Macro-Cell Base Station 10 and Small-or-Medium-Scale Base Station 30

Information (4): Position Information of Communication Terminal 20

Information (5): Pairing between Communication Terminal 20 and Macro-Cell Base Station 10

Information (6): Quality of Communication Link between Communication Terminal 20 and Macro-Cell Base Station 10

Hereinafter, methods of acquiring the above-described information will be sequentially described.

Information (1): Operation Information of Macro Cell

The operation information of the macro cell corresponds to system information indicating a cell ID of the macro cell, a cell search list, a center frequency, or a bandwidth, uplink/downlink traffic information, and the like.

When a wired connection to the management server 16 is established, the small-or-medium-scale base station 30 acquires the operation information of the macro cell from the management server 16. On the other hand, when the wired connection to the management server 16 is not established, the small-or-medium-scale base station 30 acquires the operation information of the macro cell by decoding a physical broadcast channel (PBCH), a physical downlink control channel (PDCCH), or the like transmitted from the macro-cell base station 10. In addition, the small-or-medium-scale base station 30 appropriately updates system information, if necessary, using frequency information or the like acquired during previous communication and stored in a memory as system information.

When the small-or-medium-scale base station 30 can also acquire the operation information of the macro cell by one of wired communication with the management server 16 and wireless communication with the macro-cell base station 10, the operation information of the macro cell may be acquired by one type of communication according to a predetermined standard. For example, the small-or-medium-scale base station 30 may use the wired communication when it is difficult to decode a radio signal because of bad characteristics of the wireless connection, use the wireless communication when the latency of the wired communication is large, and use communication having low power consumption when the reduction of power consumption is desired.

Information (2): Position Information of Macro-Cell Base Station 10

The small-or-medium-scale base station 30 acquires the position information of the macro-cell base station 10 from the macro-cell base station 10 or the management server 16. Alternatively, the small-or-medium-scale base station 30 may estimate the position information of the macro-cell base station 10 based on a reference signal received from the macro-cell base station 10.

Information (3): Communication-Path Environment Between Macro-Cell Base Station 10 and Small-or-Medium-Scale Base Station 30

The small-or-medium-scale base station 30 estimates the information indicating the communication-path environment between the macro-cell base station 10 and the small-or-medium-scale base station 30 from an SINR or signal strength of a downlink reference signal or the like transmitted from the macro-cell base station 10.

Information (4): Position Information of Communication Terminal 20

The small-or-medium-scale base station 30 acquires the position information of the communication terminal 20 from the management server 16 in a fixed network.

Alternatively, the small-or-medium-scale base station 30 receives a uplink reference signal transmitted from the communication terminal 20, and estimates a positional relationship between the small-or-medium-scale base station 30 and the communication terminal 20 according to reception power. For example, when the small-or-medium-scale base station 30 can recognize transmission power of the communication terminal 20, the small-or-medium-scale base station 30 may estimate a distance from the communication terminal 20 based on the transmission power of the communication terminal 20, path loss, and reception power. The small-or-medium-scale base station 30 may recognize the transmission power of the communication terminal 20 by referring to transmission power control information of a physical downlink shared channel (PDSCH) or a physical uplink shared channel (PUSCH) described in the PDCCH transmitted from the macro-cell base station 10.

Alternatively, the small-or-medium-scale base station 30 receives a transmission signal of a RACH transmitted from the communication terminal 20, and estimates a positional relationship between the small-or-medium-scale base station 30 and the communication terminal 20 according to reception power. For example, when the small-or-medium-scale base station 30 can recognize transmission power of the communication terminal 20, the small-or-medium-scale base station 30 may estimate a distance from the communication terminal 20 based on the transmission power of the communication terminal 20, path loss, and reception power. The small-or-medium-scale base station 30 may recognize the transmission power of the communication terminal 20 by referring to transmission power control information transmitted from the macro-cell base station 10 to the communication terminal 20 in a process of a physical random access channel (PRACH).

Information (5): Pairing Between Communication Terminal 20 and Macro-Cell Base Station 10

The small-or-medium-scale base station 30 acquires the information indicating the pairing between the communication terminal 20 and the macro-cell base station 10 from the management server 16 in the fixed network.

Alternatively, the small-or-medium-scale base station 30 may determine which macro-cell base station 10 is being connected to the communication terminal 20 by decoding the PBCH and the PDCCH transmitted from the macro-cell base station 10.

Information (6): Quality of Communication Link Between Communication Terminal 20 and Macro-Cell Base Station 10

The small-or-medium-scale base station 30 acquires the information indicating the quality of the communication link between the communication terminal 20 and the macro-cell base station 10 from the management server 16 in the fixed network.

Alternatively, because PUSCH or RACH retransmission is considered to be iterated when a signal of the same pattern is transmitted from the communication terminal 20 at a plurality of times, the small-or-medium-scale base station 30 may determine that the communication link between the communication terminal 20 and the macro-cell base station 10 is bad in such a case.

Alternatively, the small-or-medium-scale base station 30 may determine the link quality between the communication terminal 20 and the macro-cell base station 10 based on a physical uplink control channel (PUCH) and a signal level of a UL reference signal transmitted from the communication terminal 20 to the macro-cell base station 10.

3. Content of Operation Ranges

Examples of methods of acquiring the information (1) to (6) to be used for the small-or-medium-scale base station 30 to select an operation range have been described. Next, content of each of the operation ranges A to D will be described.

(Operation Range A)

Communication for reinforcing a communication link between the macro-cell base station 10 and the communication terminal 20A is included in the operation range A as described above. Examples of the above-described communication are relay communication and coordinated multiple (CoMP) transmission/reception to/from the macro-cell base station 10.

Therefore, when a resource (time-frequency slot) different from that of the macro-cell base station 10 is acquirable, the small-or-medium-scale base station 30, which operates according to the operation range A, performs relay communication of transmission/reception data of a link to be reinforced or CoMP transmission/reception in a state of carrier aggregation. On the other hand, when a resource different from that of the macro-cell base station 10 is not acquired, the small-or-medium-scale base station 30, which operates according to the operation range A, performs CoMP transmission/reception of transmission/reception data of a link to be reinforced to/from the macro-cell base station 10.

The small-or-medium-scale base station 30 can cooperate with the macro-cell base station 10 using a wired interface such as radio on fiber or X2_IF or a wireless interface.

(Operation Range B)

Communication for increasing an area capacity is included in the operation range B as described above. An example of the above-described communication is overlay transmission (or underlay transmission). Here, the overlay transmission is a normal base-station operation, which is performed using the same time-frequency slot as in the macro-cell base station 10 or either small-or-medium-scale base station within the macro cell. The overlay transmission is an operation different from relay communication or a CoMP operation. For a slot for the overlay transmission, it is preferable that the macro-cell base station 10 allocate a slot different from slots to be used for transmission of the PBCH, a Sync. ch, and a PUCCH/PDCCH so as to secure the quality of the macro-cell base station 10.

However, because the overlay transmission leads to interference with other communication within the macro cell, it is important that the small-or-medium-scale base station 30 appropriately control transmission power when the overlay transmission is performed.

Figure 4:
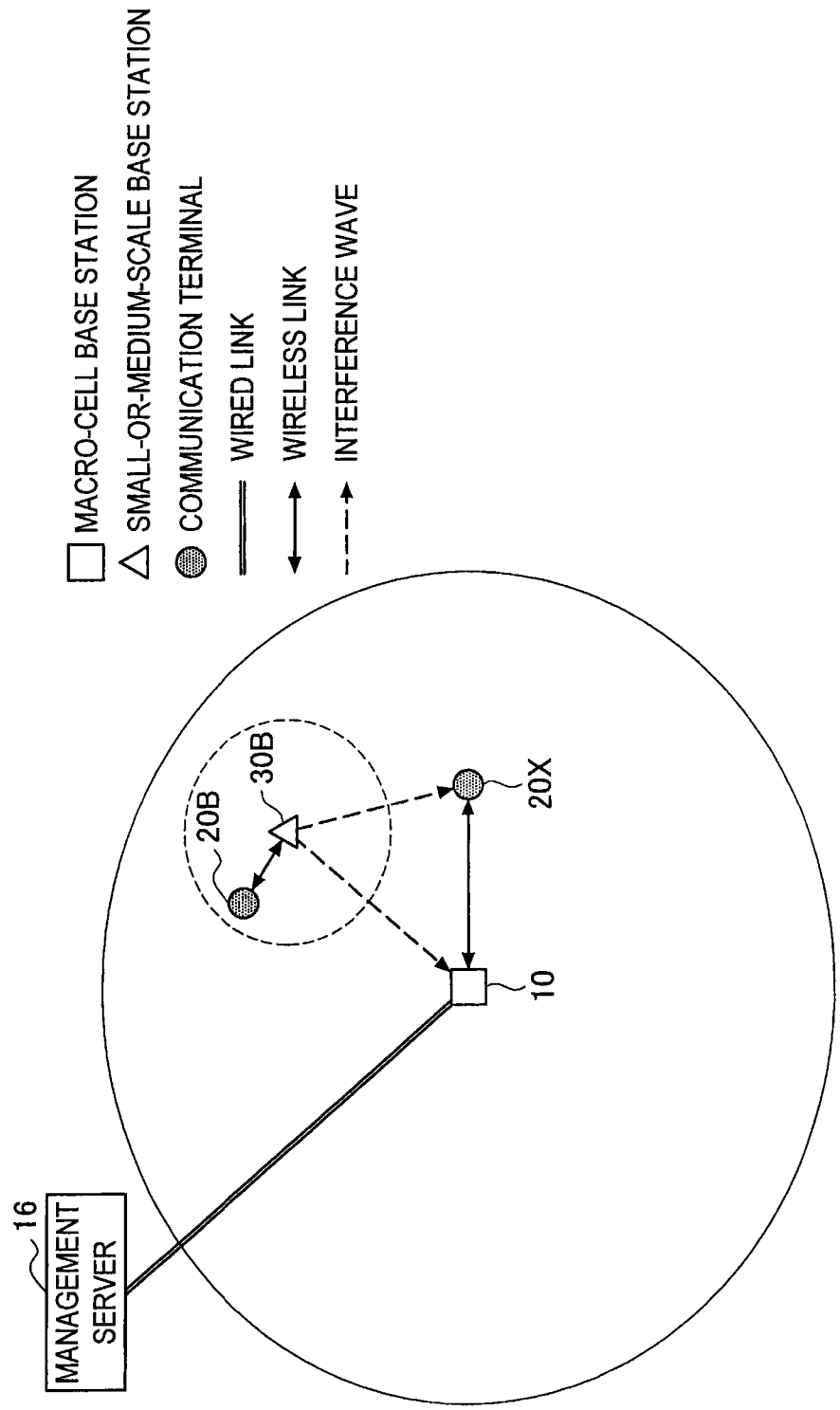
FIG. 4 is an explanatory diagram illustrating an example of interference to be considered during overlay transmission.

FIG. 4 is an explanatory diagram illustrating an example of interference to be considered during the overlay transmission. As illustrated in FIG. 4, if the small-or-medium-scale base station 30B performs overlay transmission for communicating with the communication terminal 20B, a radio signal transmitted from the small-or-medium-scale base station 30B reaches the macro-cell base station 10 and a communication terminal 20X as an interference wave.

Here, the small-or-medium-scale base station 30B can calculate a level of interference given by the small-or-medium-scale base station 30B to the macro-cell base station 10 by subtracting path loss from transmission power based on path loss (transmission path) information with the macro-cell base station 10. Likewise, the small-or-medium-scale base station 30B can calculate a level of interference given by the small-or-medium-scale base station 30B to the communication terminal 20X by subtracting path loss from transmission power based on path loss with the communication terminal 20X.

Therefore, the small-or-medium-scale base station 30B can perform overlay transmission by controlling transmission power so that levels of interference given to the macro-cell base station 10 and the communication terminal 20X are less than permissible interference amounts of the macro-cell base station 10 and the communication terminal 20X.

The small-or-medium-scale base station 30 acquires information regarding a peripheral communication terminal 20 when performing the overlay transmission. For example, the small-or-medium-scale base station 30 may acquire information (position information, an ID, reserved-slot information of UL transmission, and the like) regarding the peripheral communication terminal 20 from the macro-cell base station 10. Alternatively, the small-or-medium-scale base station 30 may acquire the reserved-slot information of the communication terminal 20 by receiving the PDCCH, and estimate position information of the communication terminal 20 based on reference of the PUSCH. Alternatively, the small-or-medium-scale base station 30 may estimate a communication-path environment between the small-or-medium-scale base station 30 and the communication terminal 20 based on the reference of the PUSCH after acquiring the reserved-slot information of the communication terminal 20.

(Operation Range C)

Communication for extending coverage is included in the operation range C as described above. Examples of the above-described communication are relay communication and overlay transmission.

Therefore, when a resource (time-frequency slot) different from that of the macro-cell base station 10 is acquirable, the small-or-medium-scale base station 30, which operates according to the operation range C, performs relay communication of transmission/reception data of a link to be reinforced or an operation of an independent cell. On the other hand, when a resource different from that of the macro-cell base station 10 is not acquirable, the small-or-medium-scale base station 30, which operates according to the operation range C, performs the overlay transmission to the macro cell. The small-or-medium-scale base station 30 may prevent interference by performing transmission power control or beam steering during overlay transmission.

(Operation Range D)

Communication for operating an independent cell is included in the operation range D as described above. Therefore, the small-or-medium-scale base station 30, which operates according to the operation range D, operates the independent cell by controlling a transmission parameter such as maximum transmission power using an acquired resource.

4. Method of Selecting Operation Range

The operation ranges A to D assumed to be implemented in the small-or-medium-scale base station 30 have been described above. Next, a method in which the small-or-medium-scale base station 30 selects the operation range will be described.

Figure 5:
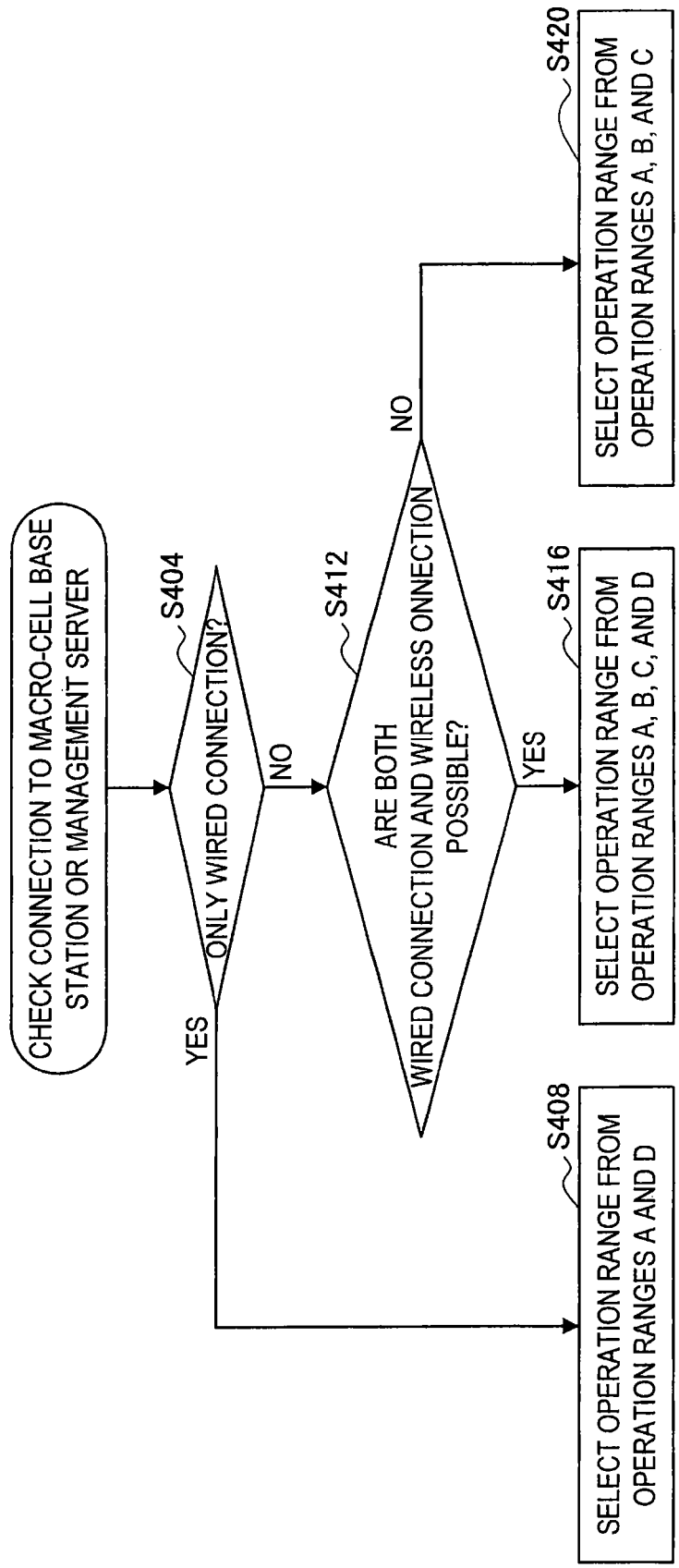
FIG. 5 is an explanatory diagram illustrating a method of selecting an operation range.

As illustrated in FIG. 5, the operation-range selection unit 340 of the small-or-medium-scale base station 30 first checks a connection relationship between the macro-cell base station 10 or the management server 16 and the small-or-medium-scale base station 30. When a connection between the macro-cell base station 10 or the management server 16 and the small-or-medium-scale base station 30 is only the wired connection, the operation-range selection unit 340 selects the operation range from the operation ranges A and D (S408). A method of selecting the operation range from the operation ranges A and D will be described later with reference to FIG. 6.

On the other hand, when the connection between the macro-cell base station 10 or the management server 16 and the small-or-medium-scale base station 30 is both the wired connection and the wireless connection (S412), the operation-range selection unit 340 selects the operation range from among the operation ranges A to D (S416). A method of selecting the operation range from among the operation ranges A to D will be described later with reference to FIG. 8.

In addition, when the connection between the macro-cell base station 10 or the management server 16 and the small-or-medium-scale base station 30 is only the wireless connection (S412), the operation-range selection unit 340 selects the operation range from among the operation ranges A, B, and C (S420). A method of selecting the operation range from among the operation ranges A, B, and C will be described later with reference to FIG. 7.

Figure 6:
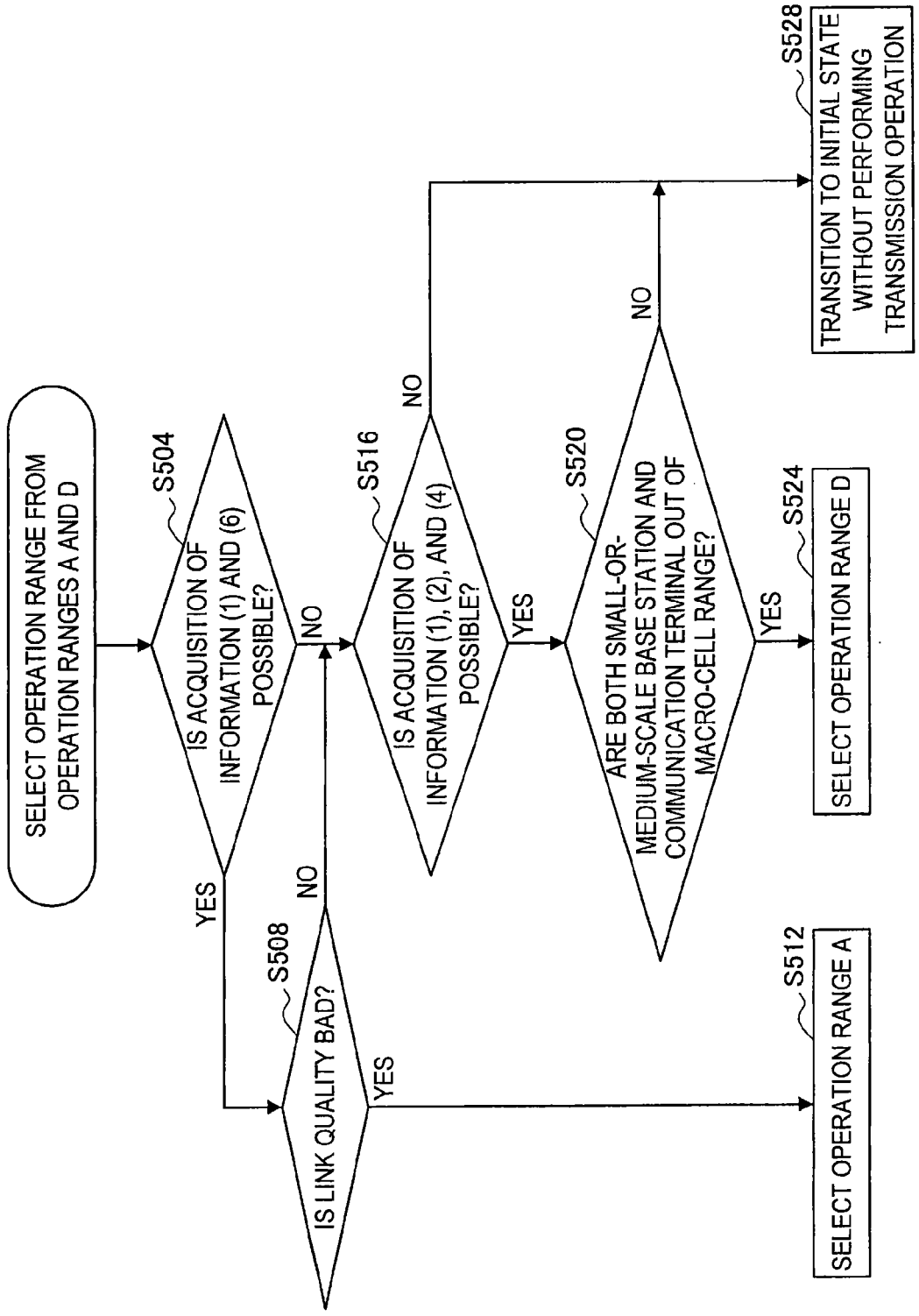
FIG. 6 is an explanatory diagram illustrating a method of selecting an operation range.

FIG. 6 is a flowchart illustrating a method in which the small-or-medium-scale base station 30 selects the operation range from the operation ranges A and D. As illustrated in FIG. 6, when the above-described information (1) to (6) is acquirable (S504), the operation-range selection unit 340 of the small-or-medium-scale base station 30 determines whether or not link quality between the peripheral communication terminal 20 and the macro-cell base station 10 is bad based on the above-described information (S508). When the link quality between the peripheral communication terminal 20 and the macro-cell base station 10 is bad, the operation-range selection unit 340 selects the operation range A so as to improve the link quality (S512).

On the other hand, when the information (1) and (6) is not acquirable but the information (1), (2), and (4) is acquirable (S516), the operation-range selection unit 340 determines whether or not both the small-or-medium-scale base station 30 and the communication terminal 20 are out of the range of the macro cell based on the above-described information (S520). When both the small-or-medium-scale base station 30 and the communication terminal 20 are out of the range of the macro cell, the operation-range selection unit 340 selects the operation range D so as to provide a communication opportunity to the communication terminal 20 (S524).

When the information (1), (2), and (4) is determined not to be acquirable in S516 and at least one of the small-or-medium-scale base station 30 and the communication terminal 20 is determined to be in the range of the macro cell in S520, the operation-range selection unit 340 does not select any operation range. In this case, the small-or-medium-scale base station 30 transitions to an initial state without performing an operation of transmission to the communication terminal 20 (S528).

Figure 7:
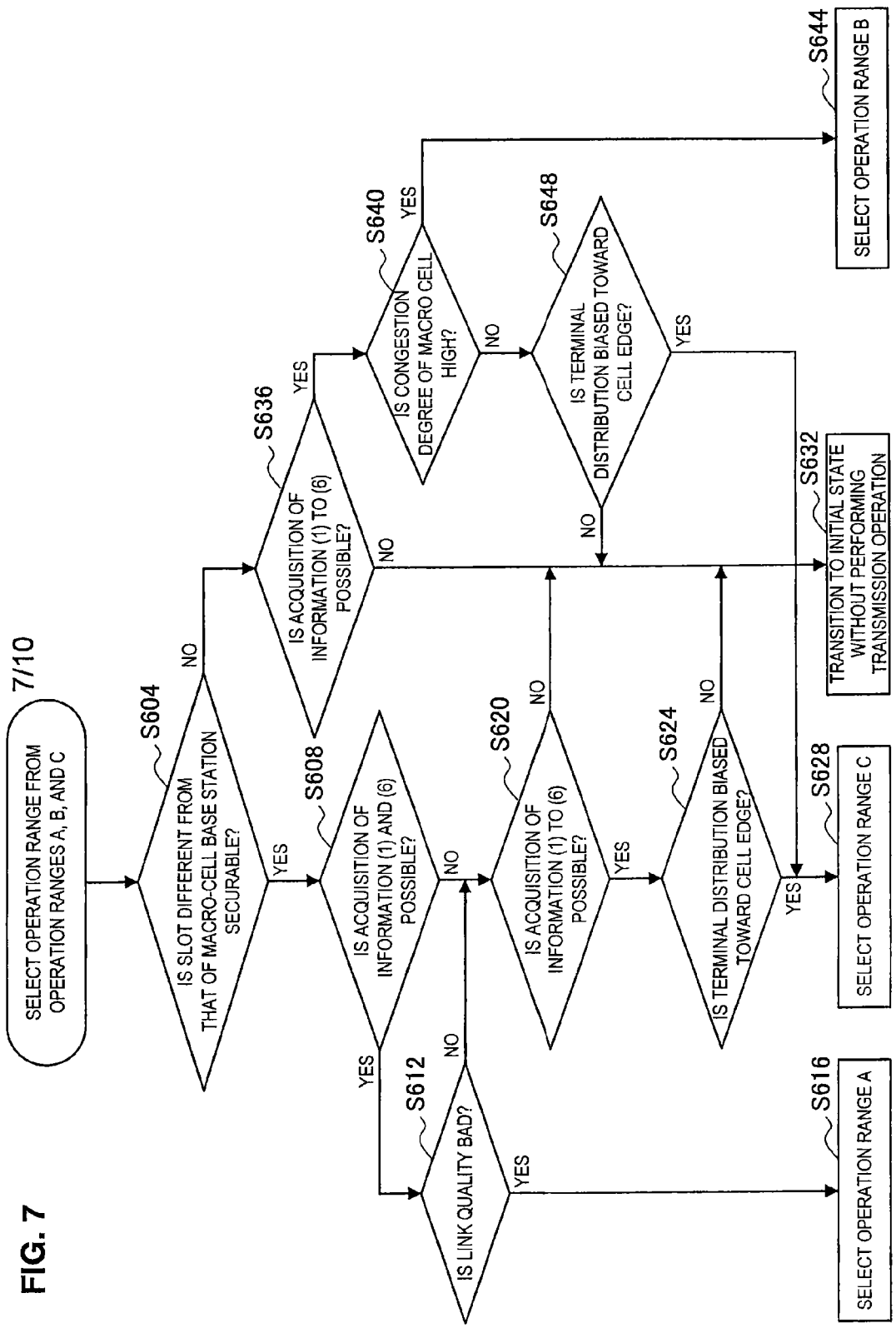
FIG. 7 is an explanatory diagram illustrating a method of selecting an operation range.

FIG. 7 is a flowchart illustrating a method in which the small-or-medium-scale base station 30 selects the operation range from among the operation ranges A, B, and C. As illustrated in FIG. 7, when a slot different from that of the macro-cell base station 10 is securable (S604) and the information (1) and (6) is acquirable (S608), the operation-range selection unit 340 of the small-or-medium-scale base station 30 determines whether or not the link quality between the peripheral communication terminal 20 and the macro-cell base station 10 is bad based on the above-described information (S612). When the link quality between the peripheral communication terminal 20 and the macro-cell base station 10 is bad, the operation-range selection unit 340 selects the operation range A (S616).

On the other hand, when the link quality is determined not to be bad in S612 and the information (1) and (6) is acquirable (S620), the operation-range selection unit 340 determines whether or not a distribution of communication terminals 20 is biased toward a cell edge of the macro cell based on the above-described information (S624). For example, when an average value of distances of a plurality of communication terminals 20 from the macro-cell base station 10 within the macro cell is greater than a predetermined value, the operation-range selection unit 340 may determine that the distribution of the communication terminals 20 is biased toward the cell edge of the macro cell. When the distribution of the communication terminals 20 is biased toward the cell edge of the macro cell, the operation-range selection unit 340 selects the operation range C so as to extend the coverage (S628).

In addition, when the slot different from that of the macro-cell base station 10 is not securable and the information (1) to (6) is acquirable (S636), the operation-range selection unit 340 determines whether or not a degree of congestion of the macro cell is greater than a predetermined standard based on the above-described information (S640). When the degree of congestion of the macro cell is greater than the predetermined standard, the operation-range selection unit 340 selects the operation range B so as to increase the area capacity (S644).

On the other hand, when the degree of congestion of the macro cell is not greater than the predetermined standard, the operation-range selection unit 340 determines whether or not the distribution of the communication terminals 20 is biased toward the cell edge of the macro cell (S648). When the distribution of the communication terminals 20 is biased toward the cell edge of the macro cell, the operation-range selection unit 340 selects the operation range C so as to extend the coverage (S628).

When the information (1) to (6) is determined not to be acquirable in S620 or S636 and when the distribution of the communication terminals 20 is determined not to be biased toward the cell edge of the macro cell in S624 or S648, the operation-range selection unit 340 does not select any operation range. In this case, the small-or-medium-scale base station 30 transitions to the initial state without performing an operation of transmission to the communication terminal 20 (S632).

Figure 8:
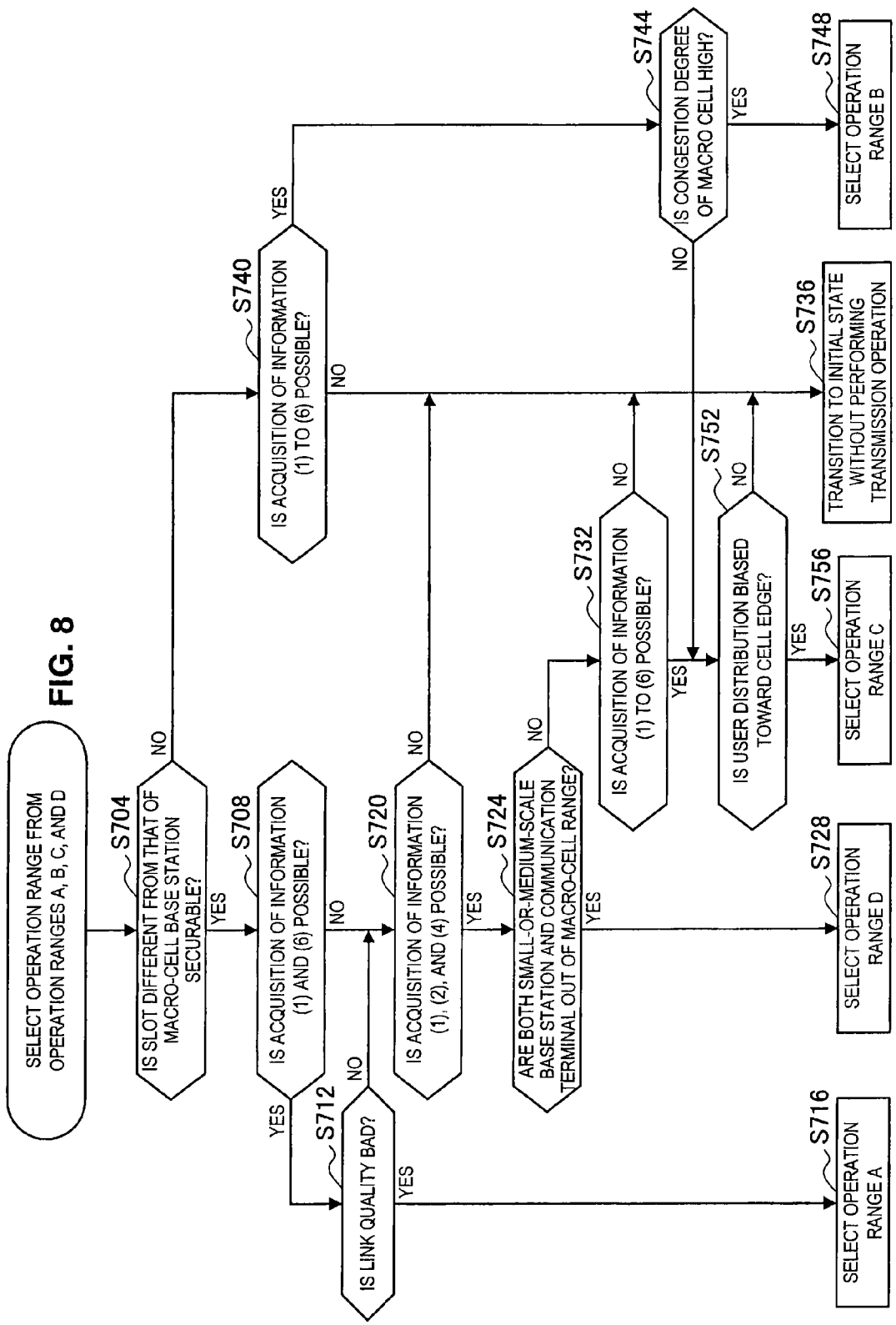
FIG. 8 is an explanatory diagram illustrating a method of selecting an operation range.

FIG. 8 is a flowchart illustrating a method in which the small-or-medium-scale base station 30 selects the operation range from among the operation ranges A to D. As illustrated in FIG. 8, when a slot different from that of the macro-cell base station 10 is securable (S704) and the information (1) and (6) is acquirable (S708), the operation-range selection unit 304 of the small-or-medium-scale base station 30 determines whether or not link quality between the peripheral communication terminal 20 and the macro-cell base station 10 is bad based on the above-described information (S712). When the link quality between the peripheral communication terminal 20 and the macro-cell base station 10 is bad, the operation-range selection unit 340 selects the operation range A (S716).

On the other hand, when the information (1) and (6) is not acquirable but the information (1), (2), and (4) is acquirable (S720), the operation-range selection unit 340 determines whether or not both the small-or-medium-scale base station 30 and the communication terminal 20 are out of the range of the macro cell based on the above-described information (S724). When both the small-or-medium-scale base station 30 and the communication terminal 20 are out of the range of the macro cell, the operation-range selection unit 340 selects the operation range D so as to provide a communication opportunity to the communication terminal 20 (S728). On the other hand, when at least one of the small-or-medium-scale base station 30 and the communication terminal 20 is in the range of the macro cell, a determination of S752 is made.

In addition, when a slot different from that of the macro-cell base station 10 is not securable and the information (1) to (6) is acquirable (S740), the operation-range selection unit 340 determines whether or not a degree of congestion of the macro cell is greater than a predetermined standard based on the above-described information (S744). When the degree of congestion of the macro cell is greater than the predetermined standard, the operation-range selection unit 340 selects the operation range B so as to increase the area capacity (S748).

On the other hand, when the degree of congestion of the macro cell is not greater than the predetermined standard, the operation-range selection unit 340 determines whether or not a distribution of the communication terminals 20 is biased toward the cell edge of the macro cell (S752). When the distribution of the communication terminals 20 is biased toward the cell edge of the macro cell, the operation-range selection unit 340 selects the operation range C so as to extend the coverage (S748).

When the information (1) to (6) is determined not to be acquirable in S732 or S740, when the distribution of the communication terminals 20 is determined not to be biased toward the cell edge of the macro cell in S752, and the like, the operation-range selection unit 340 does not select any operation range. In this case, the small-or-medium-scale base station 30 transitions to the initial state without performing an operation of transmission to the communication terminal 20 (S736).

5. Monitoring and Control by Management Server

The small-or-medium-scale base station 30 selects the operation range by the above-described method, and starts communication according to the selected operation range. If the small-or-medium-scale base station 30 starts the communication, the management server 16 monitors the communication of the small-or-medium-scale base station 30, and performs interference avoidance control, if necessary. Hereinafter, corresponding particulars will be described in detail.

(When Small-or-Medium-Scale Base Station 30 Performs Overlay Transmission)

The management server 16 monitors a report regarding a communication situation from the small-or-medium-scale base station 30, which performs overlay transmission according to the operation range B or C. The report regarding the communication situation, for example, includes a BER/PER, the number of retransmissions, a statistical value such as an average value of throughput, traffic information, or the like.

Here, when the small-or-medium-scale base station 30, which performs the overlay transmission, is in proximity of another small-or-medium-scale network and an index value such as area throughput is lower than a constant level or rapidly decreases, interference may be caused due to the overlay transmission. In this case, the management server 16 determines whether or not another resource for the overlay transmission is allocated to the small-or-medium-scale base station 30.

When the other resource is allocated, the management server 16 notifies the small-or-medium-scale base station 30 of the other resource and a change of an interference subject. The interference subject after the change newly performs sensing or information acquisition, and executes transmission power control. On the other hand, when another resource is not allocated, the management server 16 instructs the small-or-medium-scale base station 30 to stop the operation.

(When Small-or-Medium-Scale Base Station 30 Performs Cell-Area Extension Operation)

Figure 9:
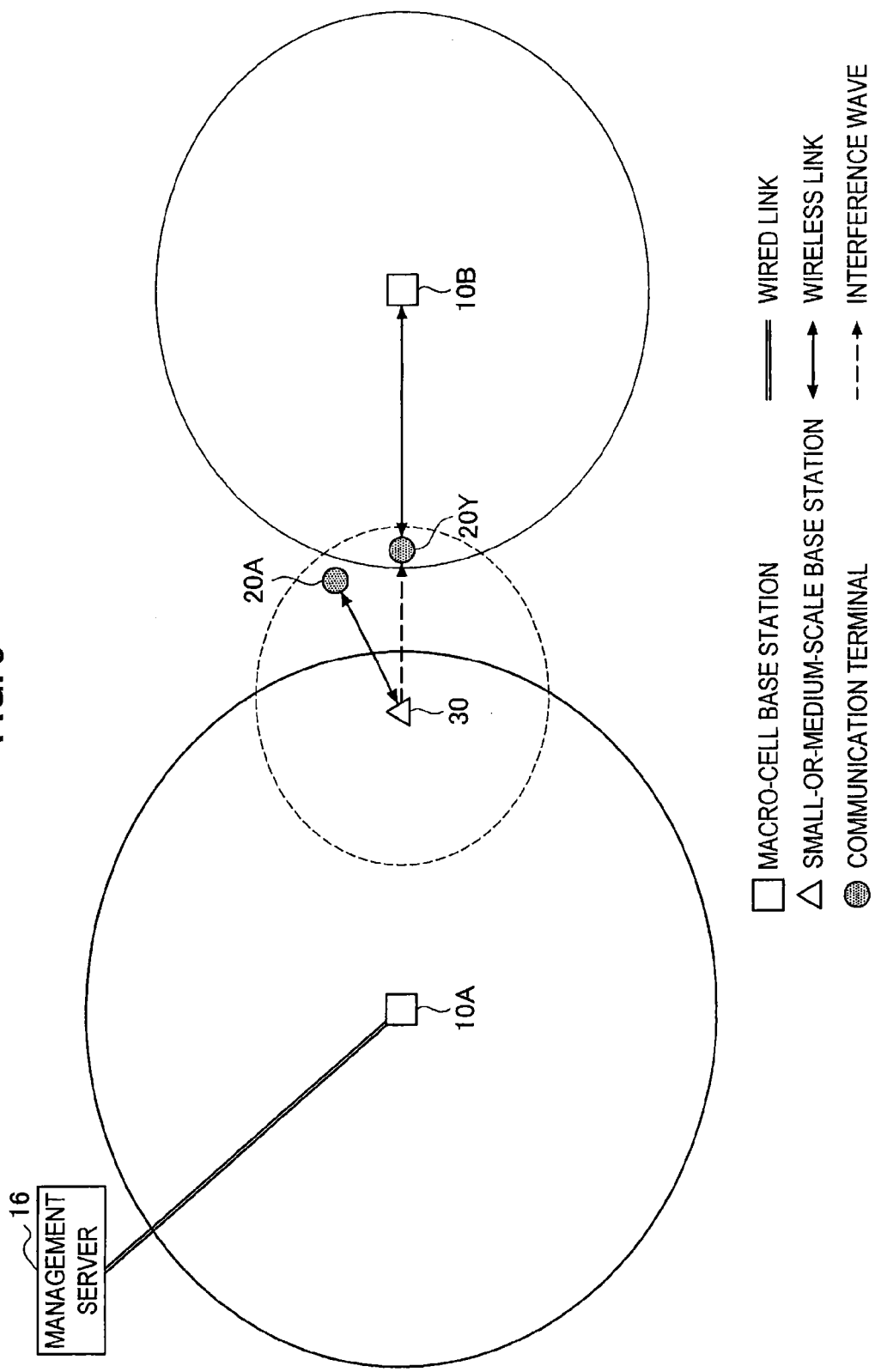
FIG. 9 is an explanatory diagram illustrating a specific example of interference that occurs due to a coverage extension.

When the small-or-medium-scale base station 30 has extended a cell area by relay communication or an operation of an independent cell, it is difficult for the small-or-medium-scale base station 30 to check interference with other communication. For example, if the small-or-medium-scale base station 30 performs communication for extending the cell area with the communication terminal 20A as illustrated in FIG. 9, the small-or-medium-scale base station 30 may interfere with a communication terminal 20Y, which communicates with the macro-cell base station 10B.

In this case, the management server 16 determines whether or not another resource is allocated to the small-or-medium-scale base station 30. When the other resource is allocated, the management server 16 notifies the small-or-medium-scale base station 30 of the other resource and a change of an interference subject. On the other hand, when no other resource is allocated, the management server 16 instructs the small-or-medium-scale base station 30 to stop the operation.

(When Small-or-Medium-Scale Base Station 30A, which Performs Link Reinforcement Operation, Is Adjacent to Small-or-Medium-Scale Base Station 30B, which Performs Overlay Transmission)

In a communication link reinforced by the small-or-medium-scale base station 30A, an SINR range adjustable by transmission power control becomes larger than usual as illustrated in FIG. 10. In this case, the management server 16 notifies the small-or-medium-scale base station 30B of an update value of a permissible interference amount by link reinforcement, and the small-or-medium-scale base station 30B, which performs overlay transmission, can set transmission power based on the update value of the notification. Thus, an increase in the area capacity is further expected.

6. Summary

As described above, the small-or-medium-scale base station 30 according to the embodiment of the present invention can autonomously select an operation range suitable for a current situation. Therefore, the small-or-medium-scale base station 30 can immediately reflect the fluctuation in a communication environment in the operation range.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps in the process of the small-or-medium-scale base station 30 of this specification are not necessarily processed in time series in the order described as the flowchart. For example, the steps in the process of the small-or-medium-scale base station 30 may be processed in an order different from the order described in the flowchart or processed in parallel. In addition, it is possible to create a computer program for causing hardware such as a CPU, ROM and RAM embedded in the small-or-medium-scale base station 30 to have the same functions as the configurations of the small-or-medium-scale base station 30 described above. In addition, a storage medium recording the computer program is also provided.

In addition, the macro-cell base station according to the embodiment of the present invention may dynamically change a coverage area of a macro cell, an amount of resources to be used, or the number of communication terminals or small-or-medium-scale base stations capable of being accommodated according to an amount of communication traffic within the macro cell or a distribution of communication terminals 20 or small-or-medium-scale base stations 30. Accordingly, the small-or-medium-scale base station may dynamically change a control operation. For example, a coverage area of the macro cell of the macro-cell base station is dynamically reduced, so that the small-or-medium-scale base station 30B, which performs communication for an increase in an area capacity in FIG. 1, may be dynamically switched to an operation of the small-or-medium-scale base station 30D, which performs communication for operating an independent cell.

REFERENCE SIGNS LIST

10 Macro-cell base station
20 Communication terminal
30 Small-or-medium-scale base station
310 Wireless communication unit
320 Network communication unit
330 Information acquisition unit
340 Operation-range selection unit
350 Communication control unit

The invention claimed is:

1. A communication control method for use in a small-or-medium-scale base station, comprising the steps of:
receiving a radio signal transmitted from a communication terminal or a large-scale base station;
acquiring information of the communication terminal or the large-scale base station by analyzing the radio signal;
selecting one operation range type for the small-or-medium-scale base station among a plurality of types of operation ranges based on the information of the communication terminal or the large-scale base station; and
communicating with the communication terminal in accordance with the operation range type for the small-or-medium-scale base station selected from among the plurality of types of operation ranges,
wherein the selecting selects the one operation range type for the small-or-medium-scale base station from among the plurality of types of operation ranges based on at least one of i) a degree of congestion of traffic in the large-scale base station, and ii) a distribution of communication terminals, including the communication terminal, with respect to the large-scale base station, and
wherein each of the plurality of types of operation ranges corresponds to one type of different types of communication support for small-or-medium-scale base station.

2. The communication control method according to claim 1,
wherein the plurality of types of operation ranges include at least one of a first operation range type for link reinforcement between the communication terminal and the large-scale base station, a second operation range type for improving a capacity, a third operation range for extending communication coverage, and a fourth operation range type in which the small-or-medium-scale base station operates a cell.

3. The communication control method according to claim 2,
wherein the step of selecting the operation range type is a step of selecting the first operation range type when a link quality between the communication terminal and the large-scale base station is less than a predetermined standard.

4. The communication control method according to claim 3,
wherein the step of selecting the operation range type is a step of selecting the second operation range type when the degree of congestion of traffic in the large-scale base station is greater than an upper limit.

5. The communication control method according to claim 4,
wherein the step of selecting the operation range type is a step of selecting the third operation range type when the distribution of the communication terminals is biased toward a cell edge of the large-scale base station.

6. The communication control method according to claim 1, where the different types of communication support for the small-or-medium-scale base station include area-capacity increase, coverage extension, link reinforcement, and independent cell operation.

7. A communication control method for use in a small-or-medium-scale base station, comprising the steps of:
receiving a radio signal transmitted from a communication terminal or a large-scale base station;
acquiring information of the communication terminal or the large-scale base station by analyzing the radio signal;
selecting one operation range among a plurality of types of operation ranges based on the information of the communication terminal or the large-scale base station; and
communicating with the communication terminal in accordance with the operation range selected from among the plurality of types of operation ranges,
wherein the plurality of types of operation ranges include a first operation range for link reinforcement between the communication terminal and the large-scale base station, a second operation range for improving a capacity, a third operation range for extending communication coverage, and a fourth operation range in which the small-or-medium-scale base station operates a cell,
wherein the step of selecting the operation range is a step of selecting the first operation range when a link quality between the communication terminal and the large-scale base station is less than a predetermined standard,
wherein the step of selecting the operation range is a step of selecting the second operation range when the degree of congestion of traffic in the large-scale base station is greater than an upper limit,
wherein the step of selecting the operation range is a step of selecting the third operation range when the distribution of the communication terminals is biased toward a cell edge of the large-scale base station, and
wherein the step of selecting the operation range is a step of selecting the fourth operation range when the small-or-medium-scale base station and the communication terminal are out of a cell area of the large-scale base station.

8. The communication control method according to claim 7, wherein the first operation range type includes a relay operation of communication between the large-scale base station and the communication terminal or a CoMP operation.

9. The communication control method according to claim 8,
wherein the second operation range type includes an overlay transmission operation.

10. The communication control method according to claim 9,
wherein the third operation range type includes the relay operation or an operation of operating a cell.

11. The communication control method according to claim 10,
wherein the step of selecting the operation range type is a step of selecting the operation range type from the first operation range type and the fourth operation range type when a connection between the large-scale base station or a network, which manages the large-scale base station, and the small-or-medium-scale base station is only a wired connection.

12. The communication control method according to claim 11,
wherein the step of selecting the operation range type is a step of selecting the operation range type from the first operation range type, the second operation range type, and the third operation range type when the connection between the large-scale base station or the network, which manages the large-scale base station, and the small-or-medium-scale base station is only a wireless connection.

13. The communication control method according to claim 12,
wherein the step of selecting the operation range type is a step of selecting the operation range type from the first operation range type, the second operation range type, the third operation range type, and the fourth operation range type when the connection between the large-scale base station or the network, which manages the large-scale base station, and the small-or-medium-scale base station is the wireless connection and the wired connection.

14. The communication control method according to claim 13,
wherein the large-scale base station or the network, which manages the large-scale base station, performs interference avoidance control for avoiding interference caused due to communication by the small-or-medium-scale base station.

15. A small-or-medium-scale base station comprising:
circuitry configured to
receive a radio signal transmitted from a communication terminal or a large-scale base station;
acquire information of the communication terminal or the large-scale base station by analyzing the radio signal;
select one operation range type for the small-or-medium-scale base station among a plurality of types of operation ranges based on the information of the communication terminal or the large-scale base station; and
control communication with the communication terminal in accordance with the operation range type for the small-or-medium-scale base station selected from among the plurality of types of operation ranges,
wherein the circuitry is further configured to select the one operation range type for the small-or-medium-scale base station from among the plurality of types of operation ranges based on at least one of i) a degree of congestion of traffic in the large-scale base station, and ii) a distribution of communication terminals, including the communication terminal, with respect to the large-scale base station, and
wherein each of the plurality of types of operation ranges corresponds to one type of different types of communication support for the small-or-medium-scale base station.

16. A communication control method for use in a small-or-medium-scale base station, comprising the steps of:
receiving a radio signal transmitted from a communication terminal or a large-scale base station;
acquiring information of the communication terminal or the large-scale base station by analyzing the radio signal;
selecting one operation range type for the small-or-medium-scale base station among a plurality of types of operation ranges based on the information of the communication terminal or the large-scale base station; and
communicating with the communication terminal in accordance with the operation range type for the small-or-medium-scale base station selected from among the plurality of types of different operation ranges,
wherein one of the plurality of types of different operation ranges is an operation range for improving a capacity, and
wherein the step of selecting the operation range type is a step of selecting the operation range for improving the capacity from among the plurality of types of different operation ranges when a degree of congestion of traffic in the large-scale base station is greater than an upper limit, and
wherein each of the plurality of types of operation ranges corresponds to one type of different types of communication support for the small-or-medium-scale base station.

* * * * *